United States Patent
Almkvist et al.

(10) Patent No.: US 12,030,498 B2
(45) Date of Patent: Jul. 9, 2024

(54) METHOD FOR BRAKING A HYBRID ELECTRIC VEHICLE

(71) Applicant: Volvo Car Corporation, Gothenburg (SE)

(72) Inventors: Göran Almkvist, Gothenburg (SE);
Jonas Björkholtz, Gothenburg (SE);
Markus Ekström, Gothenburg (SE);
Andreas Eriksson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 303 days.

(21) Appl. No.: 17/543,897

(22) Filed: Dec. 7, 2021

(65) Prior Publication Data
US 2022/0194380 A1 Jun. 23, 2022

(30) Foreign Application Priority Data
Dec. 17, 2020 (EP) .................................... 20215017

(51) Int. Cl.
*B60W 20/14* (2016.01)
*B60W 10/06* (2006.01)
(Continued)

(52) U.S. Cl.
CPC ...... *B60W 30/18127* (2013.01); *B60W 10/06* (2013.01); *B60W 10/08* (2013.01); *B60W 10/184* (2013.01); *B60W 10/26* (2013.01); *B60W 20/14* (2016.01); *B60W 20/15* (2016.01); *B60W 20/20* (2013.01); *B60W 30/18118* (2013.01); *B60W 2510/0638* (2013.01); *B60W 2510/244* (2013.01); *B60W 2552/15* (2020.02);
(Continued)

(58) Field of Classification Search
CPC ...... B60W 20/12; B60W 20/14; B60W 30/18; F02D 13/04
See application file for complete search history.

(56) References Cited

U.S. PATENT DOCUMENTS 6,155,365 A * 12/2000 Boberg ................. B60W 10/06
                                                       303/3
9,975,436 B2 * 5/2018 White ................... B60W 10/06
(Continued)

FOREIGN PATENT DOCUMENTS

DE          4446485 A1     6/1996
EP          2460679 A1     6/2012
(Continued)

OTHER PUBLICATIONS

May 6, 2021 European Search Report issued in International Application No. 20215017.

*Primary Examiner* — Tan Q Nguyen
(74) *Attorney, Agent, or Firm* — Clements Bernard Walker; Christopher L. Bernard

(57) ABSTRACT

A method for braking a hybrid electric vehicle, a hybrid electric vehicle and a computer program element. The method includes actuating braking with a brake energy, starting to regenerate the brake energy and charging a battery system with the regenerated brake energy, receiving a state of charge of the battery system, redirecting the regenerated brake energy into an integrated starter generator in case of a full or limited charging of the battery system, and activating the integrated starter generator to rotate an internal combustion engine.

20 Claims, 2 Drawing Sheets

(51) Int. Cl.
  *B60W 10/08*    (2006.01)
  *B60W 10/184*   (2012.01)
  *B60W 10/26*    (2006.01)
  *B60W 20/15*    (2016.01)
  *B60W 20/20*    (2016.01)
  *B60W 30/18*    (2012.01)

(52) U.S. Cl.
  CPC ............... *B60W 2710/0605* (2013.01); *B60W 2710/0644* (2013.01); *B60W 2710/18* (2013.01); *B60W 2710/244* (2013.01); *B60W 2720/106* (2013.01)

(56) References Cited

U.S. PATENT DOCUMENTS

| | | | | |
|---|---|---|---|---|
| 2005/0151420 A1* | 7/2005 | Crombez | ................. | B60K 6/44 |
| | | | | 903/947 |
| 2008/0110684 A1* | 5/2008 | Kaita | .................... | B60W 10/08 |
| | | | | 60/299 |
| 2008/0314663 A1* | 12/2008 | Yamazaki | ....... | B60W 30/18127 |
| | | | | 180/165 |
| 2013/0190954 A1* | 7/2013 | Abihana | ............... | B60W 10/06 |
| | | | | 180/65.265 |
| 2016/0193992 A1* | 7/2016 | Hancock | ............... | B60W 20/20 |
| | | | | 180/65.265 |

FOREIGN PATENT DOCUMENTS

EP    2896543 A1   7/2015
GB    2450234 A    12/2008

\* cited by examiner

METHOD FOR BRAKING A HYBRID ELECTRIC VEHICLE

CROSS-REFERENCE TO RELATED APPLICATION

The present disclosure claims the benefit of priority of co-pending European Patent Application No. 20 215 017.3, filed on Dec. 17, 2020, and entitled "Method for Braking a Hybrid Electric Vehicle," the contents of which are incorporated in full by reference herein.

TECHNICAL FIELD

The present disclosure relates to a method for braking a hybrid electric vehicle, a hybrid electric vehicle and a computer program for braking a hybrid electric vehicle.

BACKGROUND

In a motor vehicle, a brake system is activated to reduce a driving speed of the vehicle. Generally, the traditional brake system includes a brake disc on a wheel, which produces friction to slow or stop the vehicle. A friction energy generated during braking is converted into a heat energy, which may cause an overheating of the brake system. Alternatively, the vehicle can be slowed by applying an engine braking to reduce a thermal load on the brake disc. In case of a hybrid electric vehicle, however, a mechanical connection between an internal combustion engine and the wheel may not be necessarily provided.

The hybrid electric vehicles apply a regenerative brake system to reduce the thermal load on the brake disc and to use a battery system efficiently. During regenerative braking, an electric motor on the wheel operates in a generating mode. Accordingly, the vehicle may reduce its speed and the electric motor as an electric generator produces electricity, which is fed into the battery system.

SUMMARY

There may be a need to provide an improved braking method and an improved brake system, which allow a more efficient use of regenerative brake system.

The problem is solved by the subject matters of the independent claims of the present disclosure, wherein further embodiments are incorporated in the dependent claims. It should be noted that the aspects of the disclosure described in the following apply to the method for braking a hybrid electric vehicle, a hybrid electric vehicle and a computer program element.

According to the present disclosure, a method for braking a hybrid electric vehicle is presented. The method includes actuating braking with a brake energy, starting to regenerate the brake energy and charging a battery system with the regenerated brake energy, receiving a state of charge of the battery system, redirecting the regenerated brake energy into an integrated starter generator in case of a full or limited charging of the battery system, and activating the integrated starter generator to rotate an internal combustion engine.

The method for braking a hybrid electric vehicle allows regenerating a brake energy even though the battery system cannot be charged any more. In a common hybrid electric vehicle, if the battery system is fully charged, the battery system generally stops storing the regenerated brake energy and the vehicle is braked by a brake disc of a brake system. This may cause an overheating on the brake system. The present method enables, however, a further absorption of the brake energy by redirecting the electricity in case of the full charging of the battery system. Accordingly, the overheating of the brake disc or the brake system may be avoided.

A driver may provide a signal, for example by pressing a brake pad or by recognizing a braking situation such as a traffic jam, driving to a downhill direction or an accident, to slow or stop the vehicle. The vehicle may also identify the braking situation by itself in case of an autonomous driving mode. Accordingly, the brake system may actuate braking on wheels of the vehicle. The brake system may include an electric motor arranged between each wheel of the vehicle and the battery system. In an embodiment, the brake energy can be regenerated by the electric motor to reduce a rotation speed of the wheel.

The electric motor may act as an electric generator and convert the brake energy into electricity. The generated electricity may then be stored in the battery system. However, if the battery system is fully charged or the state of charge of the battery system have arrived at 100%, the battery system may not be charged any more. The battery system may not be fully charged but a charging may be very limited or even no more possible as well. The state of charge can be understood as a level of charge of an electric battery relative to its capacity. Accordingly, 0% of the state of charge may correspond to a fully discharged (empty) battery system and 100% of the state of charge may correspond to a fully charged battery system. A control system of the vehicle, which monitors and controls the brake system, may redirect excessive electricity into the integrated starter generator in case of a full state of charge of the battery system. The control system may be an engine control unit (ECU).

The integrated starter generator (ISG) may be installed between the internal combustion engine (ICE) and a gearbox and the ISG may replace both a starter motor and an alternator in a single electric device. The ISG may be actuated by the electric motor, which receives the excessive electricity from the brake system, and the ISG may start the ICE to rotate. Accordingly, the brake energy, which cannot be stored in the battery system due to the full state of charge or any charging limitation, may be diverted into the ICE, such that the use of brake disc may be reduced. Hence, a thermal load of the brake system can be reduced and an overheating of the brake system may be avoided.

In an embodiment, the method further includes reducing an oil and/or exhaust gas residuals entering into the internal combustion engine during a braking mode. The oil may be supplied from a crankcase in a cylinder of the ICE due to a closed throttle causing a low pressure during the engine braking mode. Generally, the engine is rotated by the ISG and the cylinder of the ICE may be provided with fuel and start to reciprocate to generate a driving energy. In case of a hybrid electric vehicle, in particular a series hybrid electric vehicle, the driving energy generated by the ICE may be transferred to the battery system via the integrated starter generator.

Since the ISG may function as a starter to consume the excessive brake energy in case of full charging of the battery system according to the disclosure, the ICE does not need to produce any driving energy. Accordingly, the ICE may not require any fuel. As a result, only air may be provided into the cylinder of the ICE such that only the air can be heated up by a compression work of the cylinder.

Also, the exhaust gas residuals may not enter back into the cylinder of the ICE. The exhaust gas residuals may be drawn in the cylinder from an exhaust side having atmospheric pressure through open overlapping valves (valve overlap), when the closed throttle restricts an airflow to a much lower pressure in an inlet system of the ICE. This can be avoided by open the throttle and/or reduce the valve overlap. The valve overlap can be understood as the state when an air intake and exhaust valves are open at the same time. Accordingly, the absorption of the brake energy by the ISG and ICE may be comparable with an engine braking in a conventional ICE system, which includes a mechanical connection between the ICE and the wheels of the vehicle to efficiently brake the vehicle.

In an embodiment, the method further includes opening a throttle to avoid an insertion of the residual gas in the internal combustion engine. The throttle may include a throttle plate rotating relative to an axis inside a throttle body to regulate an amount of an air intake and an amount of the fuel gas feeding in the ICE. By opening the throttle, the air intake may increase the pressure inside the ICE. In an embodiment, the throttle may be fully opened to allow an air flowing without any resistance and to block an entering of the oil and exhaust gas residuals in the ICE. Accordingly, the insertion of the oil and/or exhaust gas residuals may be prevented and only the air can be heated in the cylinder.

In an embodiment, the method further includes identifying a downhill driving direction. As soon as the vehicle or the control system recognizes a need of braking such as driving in the downhill direction, a traffic jam or an accident, the control system may exam the state of charge of the battery system. The control system may further decide either to charge the battery system with the regenerated brake energy or to redirect it to the integrated starter generator to operate the internal combustion engine in case of a full charging of the battery system. Accordingly, the brake energy may be efficiently regenerated dependently of a situation.

In an embodiment, the method further includes transferring a heat energy generated in the internal combustion engine to an ambient air. The air entered through the throttle into the cylinder of the ICE may be heated. Since the cylinder is, however, free of oil gas and/or exhaust gas residuals, only the air may be heated up by a compression work. The ICE may include an engine cooling system with channels surrounding the ICE to remove the heat energy from the ICE by circulating a coolant water. Accordingly, the coolant water may keep the ICE from overheating and the heat energy may be transported by the coolant water.

In an embodiment, the heat energy is transferred to the ambient air by means of a conventional radiator system via a heat exchanger. The engine cooling system may be coupled with the heat exchanger, which may be further connected to the conventional radiator system. Hence, the coolant water with the heat energy from the ICE may reach the heat exchanger, in which the heat energy may be transferred to the ambient air. Accordingly, the brake energy generated during slowing or stopping the vehicle may be efficiently converted into the heat energy via the ISG and ICE, which may be dissipated in the ambient air.

In an embodiment, the method further includes setting a variable valve timing of an air intake and/or an exhaust. The engine control unit (ECU) may adjust the variable valve timing to set an amount of the air intake and exhaust in the cylinder of the ICE, which may influence an engine performance significantly. In other words, the variable valve timing may allow an optimization of an opening of inlet and outlet valve to enhance an engine output. Accordingly, by setting the variable valve timing appropriately, a brake energy absorption by the ICE can be maximized. In this way, the engine braking may be performed in a hybrid electric vehicle without increasing a thermal load on the brake system.

In an embodiment, the method further includes varying a speed of an internal combustion engine to control a braking force. By adjusting the variable valve timing, for example, by means of late intake valve closing, early intake valve closing, early intake valve opening or early/late exhaust valve closing, the valve timing may be adapted to the speed of the ICE. Accordingly, the braking force coupled with a performance of the ICE may vary as well. The braking force may reach, hence, up to 40 kW at a downhill slop of 20% with a 2000 kg vehicle including a typical 2 liters ICE.

According to the present disclosure, also a hybrid electric vehicle is presented, which applies the braking method described above. The hybrid electric vehicle includes an integrated starter generator, an internal combustion engine, a battery system and a control system. The control system is configured to actuate braking with a brake energy, start to regenerate the brake energy and charge the battery system with the regenerated brake energy, receive a state of charge of the battery system, redirect the regenerated brake energy into the integrated starter generator in case of a full or limited charging of the battery system, and activate the integrated starter generator to rotate the internal combustion engine.

The control system may be the engine control unit (ECU) or a separate control unit. The control system may also monitor the braking steps and determine a suitable following step during braking as described above.

The hybrid electric vehicle may further include a brake system including an electric motor. The electric motor may be arranged between each wheel of the vehicle and the battery system to drive or brake the vehicle. Further, the electric motor may be coupled with the integrated starter generator.

In an embodiment, the hybrid electric vehicle includes a series hybrid mode. In general, hybrid electric vehicles may be classified into a series or a parallel hybrid vehicle. In the series hybrid mode, there is no mechanical connection between the internal combustion engine and the wheels of the vehicle. Rather, the ICE is coupled with an electric generator to convert a kinetic energy produced by the ICE into electricity. The generated electricity may then charge a battery system, which is connected to the wheels via an electric motor allowing the wheels driving. The electric motor may also act as a generator, which enables storing the regenerated brake energy in the battery system.

In the series hybrid electric vehicle, an engine braking, which may reduce a thermal load on the brake system, may not be possible due to lack of the mechanical connection between the ICE and the wheels. Moreover, if the battery system is fully charged, the regenerative brake energy may not be stored in the battery system anymore. Hence, the vehicle may be braked by using a brake disc, which would lead to an increase of the thermal load on the brake disc of the brake system.

However, by redirecting the regenerated brake energy to the integrated starter generator as described above, the excess brake energy, which may not be captured by the battery system anymore, may still be used to rotate the ICE. The ICE may produce a heat energy, which may be discharged in the ambient air by the radiator system. Accordingly, the brake system may regenerate the brake energy even in a full state of charge of the battery system and a braking force may be adjusted in accordance with the ICE performance.

According to the present disclosure, also a computer program element for braking a hybrid electric vehicle as described above is presented. The program element is adapted to perform the method steps as described above, when being executed by a processing element. The program element is implemented as a non-transitory computer-readable medium including instructions stored in a memory and executed by the processing element to carry out all appropriate method steps.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawings.

DESCRIPTION OF EMBODIMENTS

Figure 1:
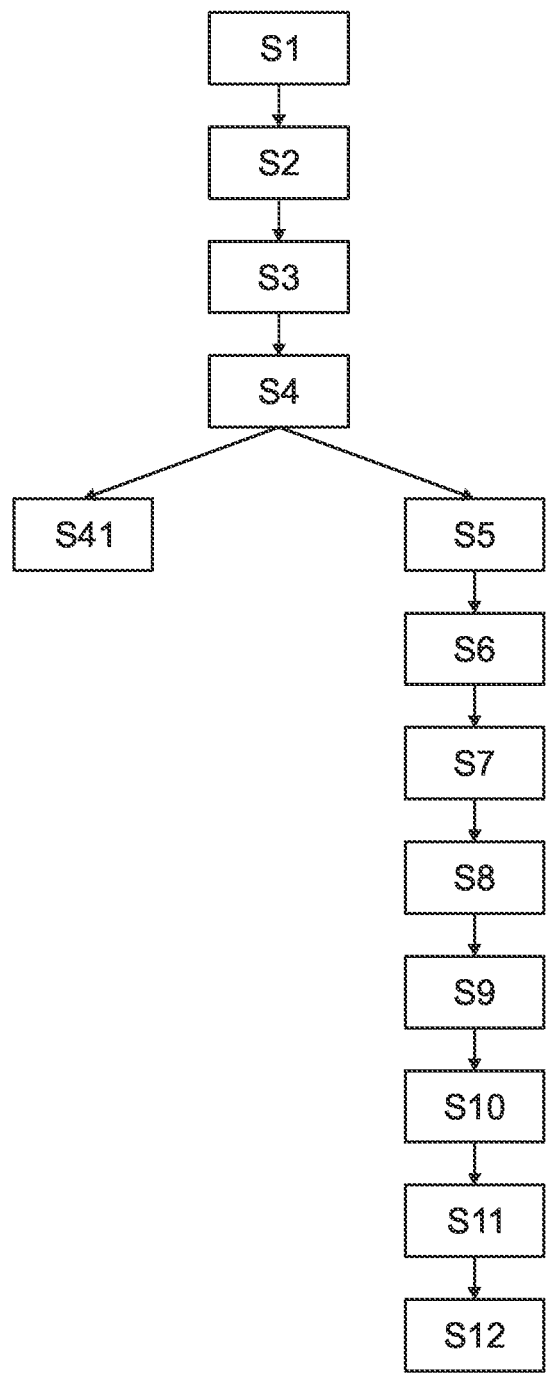
FIG. 1 shows schematically and exemplarily an embodiment of a method for braking a hybrid electric vehicle according to the disclosure.

FIG. 1 shows a schematic view of an exemplary embodiment of a method for braking a hybrid electric vehicle according to the disclosure. The hybrid electric vehicle includes a brake system, an electric motor and a battery system. In the hybrid electric vehicle, braking the vehicle can be performed by operating the electric motor as a generator, in which a brake energy produced during a brake event can be converted into electricity and the battery system can be charged with the regenerated brake energy. However, if a state of charge of the battery system is full, the battery cannot be charged anymore, thus the electric motor stops regenerating the brake energy. Instead, the vehicle is slowed or stopped by a brake disc of the brake system, which may cause an overheating of the brake system, particularly during driving in a downhill direction.

The hybrid electric vehicle in a series mode includes no mechanical connection between wheels and an internal combustion engine of the vehicle. Hence, if a state of charge of the battery system full, a conventional engine braking, which may avoid an overheating of the brake system, is not possible.

If the vehicle identifies S1 a need of braking such as driving in the downhill direction, the brake system actuates braking S2. The electric motor starts to regenerate S3 a brake energy received from the brake system. The regeneration of the brake energy may be performed by rotating the electric motor in a generator mode, in which the brake energy is converted into electricity.

The control system receives S4 simultaneously a state of charge of the battery system, whether it has an enough capacity for charging or not. If the battery system has a free charging capacity, which means the state of charge is not 100%, the battery system is charged with the produced electricity S41. In case of a full charging of the battery system or whenever the battery system does not allow charging of all brake energy, however, the regenerated brake energy is redirected S5 to an integrated starter generator (ISG). Accordingly, the ISG is activated S6 and the internal combustion engine (ICE) can be rotated by the ISG.

Once the ICE starts, a throttle inside the ICE is opened S7 to avoid an insertion of oil and/or exhaust gas residuals in the internal combustion engine. Accordingly, an entrance of the oil and/or exhaust gas residuals is blocked S8 and only air may be fed into a cylinder of the ICE. Additionally, the variable valve timing is appropriately set S9 to adjust an amount of an air intake in the cylinder and an amount of an air exhaust out of the cylinder of the ICE. The variable valve timing may influence an engine performance significantly and a brake energy absorption by the ICE can be maximized.

Further, a speed of the ICE is varied S10 to control a braking force. The speed of the ICE may be adapted to the variable valve timing. By increasing the speed of the ICE, for example, the integrated starter generator may require higher regenerated brake energy to support the ICE. In other words, a braking force is dependent of the performance of the ICE.

Figure 2:
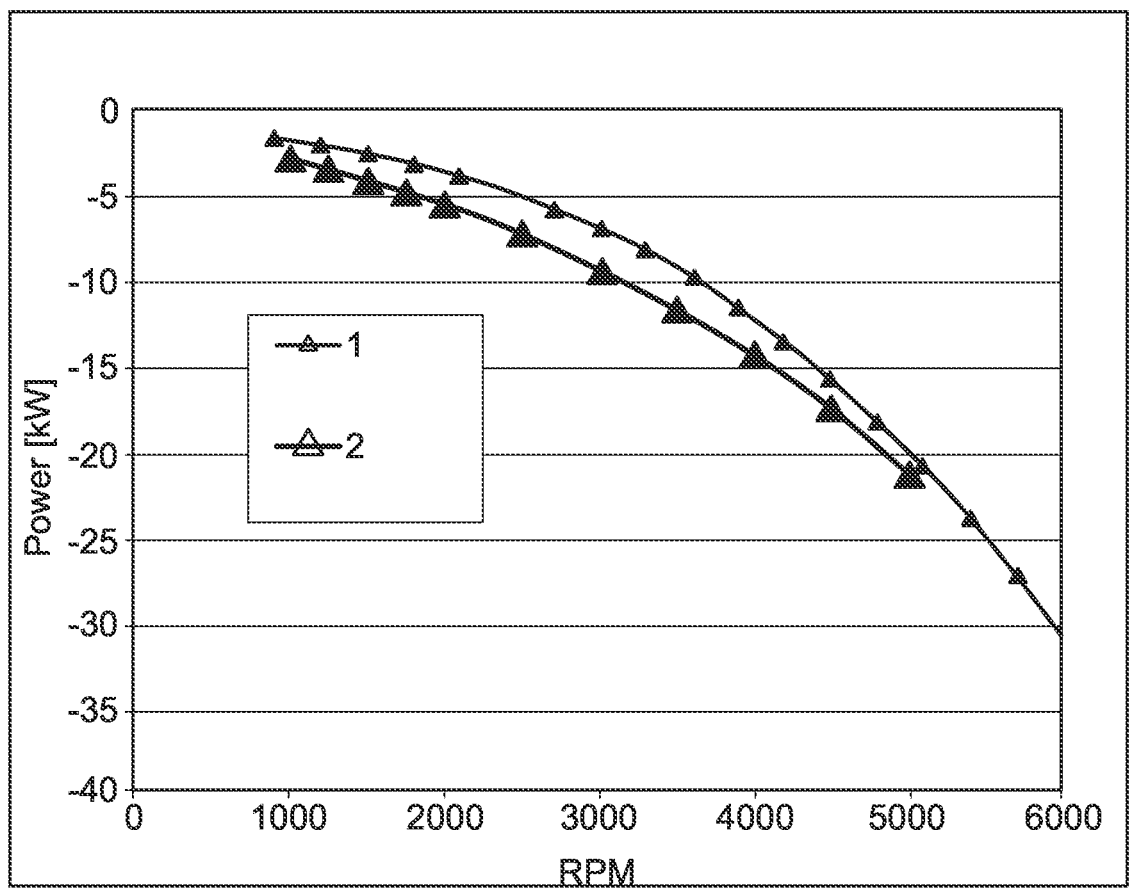
FIG. 2 shows schematically and exemplarily a diagram of a braking force generated by a typical 2 liters internal combustion engine according to the disclosure.

As shown in FIG. 2, the braking force increases as the performance of the ICE increases. The braking force may reach, hence, up to 40 kW in a typical 2 liters engine, which corresponds to a downhill slop of 20% with a 2000 kg vehicle. The upper curve with the reference number 1 shows an increasing braking force with a fully opened throttle and the lower curve with the reference number 2 shows an increasing braking force with a nearly closed throttle. Accordingly, the opened throttle may not only prevent an insertion of oil and/or exhaust gas residuals into the ICE but also result in the best braking force.

The heat energy generated in the ICE by the air may be transferred to a coolant water, which circulates between a radiator system and the ICE. The coolant water with the heat energy is transported S11 to a conventional radiator system of the vehicle via a heat exchanger. The heat energy is then transferred S12 in the conventional radiator system to an ambient air. Accordingly, the excessive brake energy can be continuously regenerated and dissipated in the ambient air in form of the heat energy. Moreover, the brake system may be prevented from an overheating.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an"

does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for braking a hybrid electric vehicle, comprising:
    actuating braking with a brake energy,
    starting to regenerate the brake energy and charging a battery system with the regenerated brake energy,
    receiving a state of charge of the battery system,
    in case of a full or limited charging of the battery system, redirecting the regenerated brake energy into an integrated starter generator,
    activating the integrated starter generator to rotate an internal combustion engine and
    reducing oil and/or exhaust gas residuals entering into the internal combustion engine during a braking mode.

2. The method according to claim 1, further comprising opening a throttle to avoid an insertion of the oil and/or exhaust gas residuals in the internal combustion engine.

3. The method according to claim 2, wherein the opening the throttle to avoid the insertion of the oil and/or exhaust gas residuals in the internal combustion engine allows air to flow without any resistance during the braking mode and blocks entering of the oil and/or exhaust gas residuals in the internal combustion engine, such that only the air can be heated in a cylinder of the internal combustion engine.

4. The method according to claim 1, the brake energy being regenerated by an electric motor.

5. The method according to claim 1, further comprising identifying a downhill driving direction.

6. The method according to claim 1, further comprising transferring a heat energy generated in the internal combustion engine to an ambient air.

7. The method according to claim 6, the heat energy being transferred to the ambient air by means of a conventional radiator system via a heat exchanger.

8. The method according to claim 1, further comprising setting a variable valve timing of an air intake and/or an exhaust.

9. The method according to claim 1, further comprising varying a speed of the internal combustion engine to control a braking force.

10. A hybrid electric vehicle comprising an integrated starter generator, an internal combustion engine, a battery system and a control system, the control system being configured to:
    actuate braking with a brake energy,
    start to regenerate the brake energy and charge the battery system with the regenerated brake energy,
    receive a state of charge of the battery system,
    redirect the regenerated brake energy into the integrated starter generator in case of a full or limited charging of the battery system,
    activate the integrated starter generator to rotate the internal combustion engine, and
    reduce oil and/or exhaust gas residuals entering into the internal combustion engine during a braking mode.

11. The hybrid electric vehicle according to claim 10, comprising a series hybrid mode.

12. A non-transitory computer-readable medium comprising instructions stored in a memory and executed by a processing element for carrying out steps for braking a hybrid electric vehicle, comprising:
    actuating braking with a brake energy,
    starting to regenerate the brake energy and charging a battery system with the regenerated brake energy,
    receiving a state of charge of the battery system,
    in case of a full or limited charging of the battery system, redirecting the regenerated brake energy into an integrated starter generator,
    activating the integrated starter generator to rotate an internal combustion engine, and
    reducing oil and/or exhaust gas residuals entering into the internal combustion engine during a braking mode.

13. The non-transitory computer-readable medium according to claim 12, the steps further comprising opening a throttle to avoid an insertion of the oil and/or exhaust gas residuals in the internal combustion engine.

14. The non-transitory computer-readable medium according to claim 13, wherein the opening the throttle to avoid the insertion of the oil and/or exhaust gas residuals in the internal combustion engine allows air to flow without any resistance during the braking mode and blocks entering of the oil and/or exhaust gas residuals in the internal combustion engine, such that only the air can be heated in a cylinder of the internal combustion engine.

15. The non-transitory computer-readable medium according to claim 12, the brake energy being regenerated by an electric motor.

16. The non-transitory computer-readable medium according to claim 12, the steps further comprising identifying a downhill driving direction.

17. The non-transitory computer-readable medium according to claim 12, the steps further comprising transferring a heat energy generated in the internal combustion engine to an ambient air.

18. The non-transitory computer-readable medium according to claim 17, the heat energy being transferred to the ambient air by means of a conventional radiator system via a heat exchanger.

19. The non-transitory computer-readable medium according to claim 12, the steps further comprising setting a variable valve timing of an air intake and/or an exhaust.

20. The non-transitory computer-readable medium according to claim 12, the steps further comprising varying a speed of the internal combustion engine to control a braking force.

* * * * *